Patented May 4, 1943

2,318,105

UNITED STATES PATENT OFFICE 2,318,105

HYDRATED ACETYLENE DERIVATIVES OF THE CYCLOPENTANOPOLYHYDROPHE-NANTHRENE SERIES AND PROCESS OF PREPARING SAME

Leopold Ruzicka, Zurich, Switzerland, assignor, by mesne assignments, to Ciba Pharmaceutical Products, Incorporated, Summit, N. J., a corporation of New Jersey No Drawing. Application July 17, 1939, Serial No. 285,020. In Switzerland July 23, 1938

4 Claims. (Cl. 260—397.4)

My investigations have shown that the addition of water to cyclopentanopolyhydrophenanthrene-compounds which contain an ethinyl-group is difficult if the compound is treated as usual with a strong acid and a heavy metal salt of catalytic action. There are obtained chiefly only oily products which are mixtures of various compounds. The relatively easy elimination of water from 17-hydroxy-17-ethinyl derivatives of the cyclopentanopolyhydrophenanthrene series which occurs under the influence of acids makes it extraordinarily difficult to produce for example the corresponding ketones in this manner.

This invention relates to a process by which the addition of acids, acid halides, phenols or alcohols to steroids containing ethinyl groups is effected in the presence of a catalyst of the type of a non-metallic halide. Enol derivatives, acetals or esters produced may be treated if desired with a hydrolyzing agent and/or with an esterifying agent.

As parent materials for the process there may be used steroids which may be substituted in any desired manner in the nucleus and may be saturated or unsaturated provided they contain at least one ethinyl group, especially compounds which contain an ethinyl in 17-position. The ethinyl group itself may contain substituents, for instance a hydrocarbon residue such as alkyl, aryl, and the like. At the carbon atom that carries the ethinyl group a hydrogen atom can be exchanged for a free, an esterified or etherified hydroxyl group. Examples of such parent materials are: $\Delta^5$-17-ethinyl-androstene-3-ol, $\Delta^4$-17-ethinyl-androstene-3-one, $\Delta^5$-17-ethinyl-androstene-3:17-diol, 17-ethinyl-androstene-3:17-diol, 17-ethinyl-testosterone, 17-ethinyl-dihydrotestosterone, 17-ethinyl-oestradiol, 17-ethinyl-dihydroequiline, 17-ethinyl-dihydroequilenine, $\Delta^{4:16}$-17-ethinyl-androstadiene-3-one, $\Delta^{5:6}$-17-ethinyl-androstadiene-3-ol, as well as compounds which contain the ethinyl group in another position, for example in 2-, 3- or 16-position. These parent materials may be prepared by addition of acetylene to the corresponding nuclear ketones and if desired elimination of the new tertiary hydroxyl group.

The process of the present invention is effected by action of an organic acid, a mineral acid, an acid halide, an acid anhydride, a phenol, an alcohol, or the like in presence of a non-metallic halide. Especially suitable are the halides of non-metals of the 3rd and 4th group of the periodic system, for instance boronfluoride, siliconchloride or the like. These catalysts may also be used in the form of their complex ether compounds. The reaction may also occur in the presence of further catalysts, for instance a heavy metal salt or a heavy metal oxide. There may be present if desired a suitable diluent. If hydroxyl groups or keto groups are present in the parent material these may be esterified or etherified if desired.

In starting from ethinyl derivatives of the cyclopentanopolyhydrophenanthrene series which contain no further substituents at the carbon atom carrying the ethinyl group, there may be obtained for example by use of an organic acid, the enol ester of the corresponding ketone and by use of an alcohol, a corresponding acetal. By saponification or reesterification there may be obtained from these addition products the corresponding ketones of the cyclopentanopolyhydrophenanthrene series. On the other hand when starting from ethinyl derivatives which have at the carbon atom carrying the ethinyl group a free or substituted hydroxyl group as a further substituent, there are obtained products which probably have a carbon skeleton different from that of the parent material. It appears that during the reaction a transposition occurs due to the labile character of the intermediately formed addition product.

The following examples illustrate the invention.

*Example 1*

In a flask of 50 cc. capacity 1 gram of $\Delta^5$-17-ethinyl-androstene-3:17-diol and 0.5 gram of mercuric oxide are dissolved in the cold in 20 cc. of glacial acetic acid and 2 cc. of acetic anhydride. To this solution is added 0.3 cc. of a boronfluoride-ether-catalyst made as described in the Journal of the American Chemical Society, vol. 55, page 2858 (1933) and the mixture is shaken for one week at room temperature during which time a grey powder gradually separates.

The mixture is then poured into 300 cc. of water and the whole extracted with ether; the ethereal solution is washed at first several times with 2-N-hydrochloric acid and then with 2-N-sodium carbonate solution and water. After evaporating the ether in a vacuum a brown oil remains. For the partial saponification of the hydroxyl groups which have been esterified during the reaction the oil is boiled under reflux for ½ hour with 50 cc. of an aqueous methyl-alcohol solution of 5 per cent strength of potassium carbonate.

When the saponification is complete the mass is poured into water and the whole extracted with ether, the ethereal solution then being washed until neutral. The residue is dissolved in benzene and chromatographed with use of 20 grams of aluminium oxide. First it is elutriated with 200 cc. of benzene. After evaporation of the benzene in a vacuum there remains an oily residue which may be crystallised by addition of a little ether. After several crystallisations from a mixture of ether and methanol there is obtained a monoacetate ($C_{23}H_{34}O_4$) of a dioxyketone produced by transposition; the monoacetate melts at 221–222° C.

100 milligrams of this monoacetate are mixed with 20 cc. methanol and 0.5 cc. of a methyl-alcohol solution of 10 per cent strength of caustic potash and the mixture is boiled for 3 hours under reflux. A colorless solution is poured in 200 cc. of water and the whole is extracted with ether, the ethereal solution is washed neutral, filtered from sparingly soluble bodies, dried and evaporated.

The sparingly soluble residue is reprecipitated once from a mixture of methanol and chloroform and sublimed in a high vacuum at a block-temperature of 200° C. There is thus obtained the dioxyketone ($C_{21}H_{32}O_3$) corresponding with the monoacetate; this dioxyketone melts at 275–277° C.

The oxime made in the usual manner melts with decomposition at 245–247° C. and the 3-monoacetate prepared by acetylating with pyridine and acetic anhydride at room temperature melts at 270–272° C.

Example 2

500 milligrams of $\Delta^5$-17-ethinyl-androstene-3:17-diol-3-monoacetate, 10 cc. glacial acetic acid, 1 cc. of acetic anhydride, 500 grams of mercuric oxide and 0.3 cc. of boronfluoride-ether-catalyst are caused to react together as described in Example 1. The crude product which has been washed until neutral is immediately chromatographed without saponification. 250 milligrams of the substance are elutriated with benzene. A colourless oil is obtained which crystallizes at once on addition of ether. After recrystallisation from a mixture of ether and methanol this product melts at 190–192° C. It appears to be the diacetate ($C_{25}H_{36}O_5$) of the dioxyketone referred to in Example 1. By a saponification with a methyl-alcohol solution of 0.5 per cent strength of caustic potash there is obtained from the diacetate the corresponding dioxyketone melting at 275–277° C.

Example 3

500 milligrams of yellow mercuric oxide are dissolved in a tube in 20 cc. of glacial acetic acid and 2 cc. of acetic anhydride. 1 gram of $\Delta^5$-17-ethinyl-androstene-3:17-diol-diacetate is then added and dissolved by gently heating; the solution is allowed to cool, 0.3 cc. of boronfluoride-ether-catalyst is added and the whole is heated in the sealed tube for 16 hours at about 40–45° C. After cooling the tube is opened and the contents poured into 400 cc. of ice water; the aqueous solution is then extracted with ether, the ethereal solution washed until neutral, dried by sodium sulfate and evaporated to a small volume. There is thus obtained in good yield the diacetoxyketone described in Example 2 in the form of glittering scales of melting point 190–192° C.

Example 4

A mixture of 300 milligrams of $\Delta^5$-17-ethinyl-androstene-3:17-diol-3-acetate-17-benzoate, 150 milligrams of mercuric oxide, 5 cc. of glacial acetic acid, 1 cc. of acetic anhydride and 0.1 cc. of boronfluoride-ether-catalyst is allowed to stand for 15 minutes at room temperature and then poured into ice water. The whole is then partially neutralised by 50 cc. of 2-N-caustic soda lye and extracted with ether; the ethereal solution is washed successively with 2-N-hydrochloric acid, 2-N-sodium carbonate solution and water, dried and evaporated. The residue is the acetate-benzoate of the dioxyketone described in the preceding examples and after-recrystallisation from methanol melts at 217–217.5° C.

By saponifying this product with 0.5-N-solution of caustic potash in methanol the dioxyketone melting at 275–277° C. is obtained.

Example 5

A mixture of 450 milligrams of ethinyl-testosterone, 450 milligrams of mercuric oxide, 20 cc. of glacial acetic acid, 3 cc. of acetic anhydride and 0.3 cc. of boronfluoride-ether-catalyst is allowed to stand for 15 hours at 20° C. It is then poured into ice water and the whole is partially neutralised with 200 cc. of 2-N-caustic soda lye, then extracted with ether, the ethereal extract being washed until neutral and dried. After evaporation of the ether the residue is dissolved in benzene and this solution filtered through a column of 15 grams of aluminium oxide. From this column a mixture of benzene and ether (1:1) elutriates an oily product which crystallised on addition of methanol. The acetate ($C_{23}H_{32}O_4$) thus obtained is recrystallised from ether; it is the acetate of an oxydiketone produced by transposition and melts at 198° C.

For the saponification the acetate is dissolved in 15 cc. of methanol and after addition of 5 cc. of a methanol solution of 10 per cent strength of caustic potash the whole is boiled under reflux for 3 hours. The excess of caustic potash is neutralised by introducing carbondioxide and the methyl-alcohol is evaporated in a vacuum. The residue is mixed with water and the mixture extracted with ether, the ethereal solution washed neutral with water and dried. After evaporating the ether the crude product is rubbed with a little methanol filtered with suction and the residue washed with a little methanol and ether and dried. After recrystallising from methyl-ethylketone the hydroxydiketone ($C_{21}H_{30}O_3$) melts at about 280° C.

Example 6

2 grams of 17-ethinyl-androstane-3:17-diol-3-monoacetate and 1 gram of yellow mercuric amide are together covered with 4 cc. of glacial acetic acid and 5 cc. of acetic anhydride. 0.6 cc. of boronfluoride-ether-catalyst are then added, whereupon the whole dissolves. The solution is allowed to stand for 16 hours at room temperature and then evaporated to dryness in a vacuum at 40° C. The residue is taken up with ether, the ethereal solution washed successively with water, dilute hydrochloric acid, dilute caustic soda lye (with addition of ice) and again with water, dried and concentrated. Colourless laminae crystallise; these melt at about 229° C. For purification they are filtered in a mixture of pentane and benzene 1:1 through aluminium oxide and afterwards washed with the same solvent. After evaporating the united pentane-benzene solutions and crystallising from a mixture of ether-pentane there is obtained a pure product crystallizing in laminae and melting at 227–229° C. It is the diacetate ($C_{25}H_{38}O_5$) of a dioxyketone produced by transposition.

An isomeric diacetate of melting point 222–224° C. may be isolated from the ethereal mother liquors of the laminae melting at 229° C. For this purpose the mother liquor is mixed with pentane, whereby a mixture of laminae and needles is caused to crystallise. The mixture is absorbed in a mixture of pentane and benzene on aluminium oxide for separation and the mass is elutriated first with a mixture of pentane-benzene and then with pure benzene. The pentane-benzene-elutriate yields a further quantity of the laminae melting at 227–229° C. and the benzene elutriate yields the isomeric diacetoxyketone melting at 222–224° C. and crystallising in needles.

The diacetoxyketone of melting point 227–229° C. yields on saponification a dioxyketone ($C_{21}H_{31}O_3$) melting at 274–275° C. This latter when acetylated in the usual manner in acetic anhydride in pyridine is converted into a monoacetate melting at 244–245° C.

The diacetoxyketone of melting point 222–224° C. may be saponified to a dioxyketone melting at 205–206° C. This latter may be acetylated by acetic anhydride in pyridine to an isomeric diacetate melting at 161–162° C.

*Example 7*

1 gram of 17-ethinyl-3:17-diacetoxyandrostane and 0.5 gram of mercuric oxide are dissolved in 20 cc. of glacial acetic acid and 2 cc. of acetic anhydride, 0.3 cc. of boronfluoride-ether-catalyst is added and the whole is allowed to stand for 2 days at room temperature. The mass is worked up as described in Example 6. The product crystallises in laminae and is the diacetoxyketone of melting point 227–229° C. described in Example 6.

What I claim is:

1. A process for the manufacture of hydrated acetylene derivatives of the cyclopentanolpolyhydrophenanthrene series, which comprises treating a steroid containing an ethinyl group in 17-position with a compound containing a hydroxyl group and selected from the group consisting of an acid, an alcohol and a phenol, in the presence of a halide of a non-metal selected from the non-metals of the third and fourth groups of the periodic system as catalyst, and treating the resultant product with a hydrolyzing agent.

2. A process for the manufacture of hydrated acetylene derivatives of the cyclopentanopolyhydrophenanthrene series, which comprises treating a 17-ethinyl-androstene with a compound containing a hydroxyl group and selected from the group consisting of an acid, an alcohol and a phenol, in the presence of a halide of a non-metal selected from the non-metals of the third and fourth groups of the periodic system as catalyst, and treating the resultant product with a hydrolyzing agent.

3. The products which are hydrated acetylene derivatives of the cyclopentanopolyhydrophenanthrene series and are obtained by the reaction of 17-ethinyl-androstenes with a compound containing a hydroxyl group and selected from the group consisting of an acid, an alcohol and a phenol, in the presence of a halide of a non-metal selected from the non-metals of the third and fourth groups of the periodic system as catalyst, and then with a hydrolyzing agent.

4. The products which are hydrated acetylene derivatives of the cyclopentanopolyhydrophenanthrene series and are obtained by the reaction of a member of the group consisting of 17-ethinyl-17-hydroxy-androstenes and their esters with a compound containing a hydroxyl group and selected from the group consisting of an acid, an alcohol and a phenol, in the presence of a halide of a non-metal selected from the non-metals of the third and fourth groups of the periodic system as catalyst and then with a hydrolyzing agent.

LEOPOLD RUZICKA.